(12) United States Patent
Lais et al.

(10) Patent No.: US 11,041,743 B2
(45) Date of Patent: Jun. 22, 2021

(54) AUTOMATION FIELD DEVICE

(71) Applicant: Endress+Hauser SE+Co. KG, Maulburg (DE)

(72) Inventors: Michael Lais, Todtnau (DE); Raphael Schonhardt, Rheinfelden (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/499,377

(22) PCT Filed: Mar. 12, 2018

(86) PCT No.: PCT/EP2018/056005
§ 371 (c)(1),
(2) Date: Sep. 30, 2019

(87) PCT Pub. No.: WO2018/177725
PCT Pub. Date: Oct. 4, 2018

(65) Prior Publication Data
US 2020/0056911 A1 Feb. 20, 2020

(30) Foreign Application Priority Data
Mar. 28, 2017 (DE) ..................... 20 2017 101 790.7

(51) Int. Cl.
*G01D 11/30* (2006.01)
*F16B 2/06* (2006.01)

(52) U.S. Cl.
CPC .............. *G01D 11/30* (2013.01); *F16B 2/065* (2013.01)

(58) Field of Classification Search
CPC ................................ G01D 11/30; F16B 2/065
See application file for complete search history.

(56) References Cited

U.S. PATENT DOCUMENTS

| | | | |
|---|---|---|---|
| 2,917,267 A | 12/1959 | Riddle | |
| 4,695,030 A * | 9/1987 | Fischer | H02B 1/042 |
| | | | 248/507 |

(Continued)

FOREIGN PATENT DOCUMENTS

| | | |
|---|---|---|
| CN | 1798971 A | 7/2006 |
| CN | 202580510 U | 12/2012 |

(Continued)

*Primary Examiner* — Paul M. West
*Assistant Examiner* — Mark A Shabman
(74) *Attorney, Agent, or Firm* — Kelly J. Smith; Endress+Hauser (USA) Holding Inc.

(57) ABSTRACT

The present disclosure relates to a field device of automation technology, comprising a housing and a sensor unit sensitive for a process variable of a medium. The housing has a passageway to accommodate the sensor unit and the sensor unit protrudes from the housing through a terminal opening of the passageway. A clamping angle and a screw are introduced into the housing in a region of the housing adjoining the opening of the passageway. By means of the screw the clamping angle is shiftable in the housing a predeterminable distance in the direction of the sensor unit, and the clamping angle shifted in the direction of the sensor unit is embodied to press with a first clamping angle section of the clamping angle radially on a clamping region of the sensor unit arranged in the housing and facing the opening of the passageway.

15 Claims, 2 Drawing Sheets

(56) References Cited

U.S. PATENT DOCUMENTS

| | | | | |
|---|---|---|---|---|
| 5,440,455 A | * | 8/1995 | Rottmar | G01D 11/30 |
| | | | | 361/809 |
| 2017/0122491 A1 | * | 5/2017 | Mancuso | F16M 13/02 |
| 2017/0191855 A1 | * | 7/2017 | Hiron-Jones | G01D 11/26 |

FOREIGN PATENT DOCUMENTS

| | | |
|---|---|---|
| DE | 19532330 A1 | 3/1997 |
| EP | 3155379 B1 | 6/2016 |
| FR | 2749384 A1 | 12/1997 |
| WO | 2017009600 A1 | 1/2017 |

* cited by examiner

AUTOMATION FIELD DEVICE

CROSS-REFERENCE TO RELATED APPLICATIONS

The present application is related to and claims the priority benefit of German Patent Application No. 10 2017 101 790.7, filed on Mar. 28, 2017 and International Patent Application No. PCT/EP2018/056005, filed on Mar. 12, 2018, the entire contents of which are incorporated herein by reference.

TECHNICAL FIELD

The invention relates to a field device of automation technology, comprising a housing and a sensor unit sensitive for a process variable of a medium, wherein the housing has a passageway to accommodate the sensor unit, and wherein the sensor unit protrudes from the housing through a terminal opening of the passageway.

BACKGROUND

In automation technology, field devices are applied for determining and/or monitoring process variables, especially physical or chemical, process variables. Referred to as field devices in the case of the present invention are, in principle, all measuring devices, which are applied near to the process and which deliver, or process, process relevant information. A field device typically includes a sensor unit coming, at least partially and at least at times, in contact with the process. Of concern in such case are, for example, fill level measuring devices, flow measuring devices, pressure- and temperature measuring devices, pH-redox potential measuring devices, conductivity measuring devices, etc., which register the corresponding process variables, fill level, flow, pressure, temperature, pH value, and conductivity. Such field devices are manufactured and sold in various embodiments by the E+H group of companies.

In the case of a large number of these field devices, the sensor unit is accommodated in a passageway of the housing. In such case, a part of the sensor unit protrudes from an opening of the passageway out from the housing, so that a part of the sensor unit is in contact with the process, especially with a process medium. Especially, the sensor unit is screwed or pushed into the passageway.

Often, it is desired to be able to orient the sensor unit in the passageway flexibly with reference to the housing, since e.g. due to limitations as regards available space at the location of use only certain orientations of the field device are possible. Arranged in the housing, in such case, is also an electronics unit, which serves, for example, for producing, processing, changing and/or forwarding electrical or electronic signals. In such case, it is desirable that a certain region of the electronics unit be accessible from a certain direction. This holds, for example, for a part of the electronics unit embodied as a connection unit, which e.g. is accommodated in a connection space, which should be accessible for connection work.

Especially advantageous is when the flexible orientation can be locked and/or released by means of a securement means. Used for this in the state of the art is, for example, a screw introduced into the housing and accessible from the exterior of the housing wall. The screw presses against the sensor unit in a securement region. Due to the tensile strengths required for the securing, screws of a certain thread size must be used, e.g. M6 screws or larger.

The application of such a securement means with a sufficiently high tensile strength (i.e. a screw of a certain size) is, however, not possible, when the provided securement region is very constrained. Such is, for example, the case, when the housing is rather short.

Additionally, often a liquid tight sealing element is provided between the housing and the sensor unit in the region of the opening of the passageway. In this way, the electronic components of the above mentioned electronics unit accommodated in the housing are protected from influences of the environment and/or of the process, especially the process medium. The securement region should, in such case, be arranged as much as possible between the sealing element and the opening of the passageway. Since the arrangement of the sealing element is often predetermined based on safety-relevant considerations, this leads to additional constraints for the space available for the securement region.

SUMMARY

An object of the invention, therefore, is to provide a space saving solution for affixing the sensor unit and the housing of a field device of automation technology sufficiently permanently relative to one another.

The object is achieved by a field device of automation technology, comprising a housing and a sensor unit sensitive for a process variable of a medium. The housing has a passageway to accommodate the sensor unit, wherein the sensor unit protrudes from the housing through a terminal opening of the passageway, further comprising a clamping angle, also referenced as a clamping angle element, and a screw, wherein the clamping angle and the screw are introduced into the housing in a region of the housing adjoining the opening of the passageway. By means of the screw, the clamping angle is shiftable in the housing a predeterminable distance in the direction of the sensor unit, and wherein the clamping angle shifted in the direction of the sensor unit is embodied to press with a first clamping angle section of the clamping angle essentially radially on a clamping region of the sensor unit arranged in the housing and facing the opening of the passageway.

The clamping angle shifted in the housing by means of the screw and pressing on the clamping region of the sensor unit essentially radially locks the housing and the sensor unit together. The pressing force from the screw is led through the clamping angle, wherein the securement region embodied as clamping region can be embodied very small in comparison with the screw. This is due to the fact that, in an axial direction with reference to the sensor unit, especially in the longitudinal direction of the channel-shaped passageway, the first clamping angle section radially pressing on the clamping region claims significantly less space. Thus, the first clamping angle section can, in given cases, be so designed in its shape that the provided space is optimally utilized. In this way, through the solution of the invention, a sufficiently fixed locking is achieved, even in the case of little available space.

In an embodiment of the invention, the sensor unit is screwed or pushed into the housing. The first clamping angle section pressing on the sensor unit prevents a twisting of the sensor unit relative to the housing after the sensor unit has been screwed or pushed into the housing.

In another development of the invention, the first clamping angle section is arranged essentially parallel to, especially mounted flush with, a first housing wall adjoining the opening of the passageway. The first clamping angle section presses with a contour of the first clamping angle section on the clamping region of the sensor unit.

In a preferred embodiment of this further development, the shape of the contour of the first clamping angle section is matched to the shape of the clamping region of the sensor unit. If, for example, of concern is a sensor unit, which is essentially cylindrical in the clamping region, then the contour of the first clamping angle section has a curvature, which is matched to the radius of the essentially cylindrical clamping region of the sensor unit. By means of the contour of the clamping angle section pressing on the clamping region of the sensor unit, a securement is achieved, in the case of which a force transfer from the contour to the clamping region can take place at multiple locations of the contour. Also, such is advantageous compared with the securement known from the state of the art with a screw, in the case of which the force transfer occurs essentially only at one point, or spot.

In an embodiment of the invention, a sealing element is arranged between sensor unit and housing in a region adjoining the opening of the passageway. The clamping region is arranged between the sealing element and a region of the sensor unit protruding out from the opening of the passageway.

In an especially preferred further development of the invention, the clamping angle is inserted in a hollowed-out section of the housing. A first loss preventer preventing a taking out and/or a falling out of the clamping angle from the hollowed-out section is formed by inserting a pin-shaped element into and protruding through a second clamping angle section essentially perpendicular to the first clamping angle section.

The first and second clamping angle sections are, thus, formed by two, essentially mutually perpendicular, planar sections of the clamping angle. In this further development, the clamping angle is first inserted into the hollowed-out section of the housing, and then the pin-shaped element is inserted into the second clamping angle section. Because the pin-shaped element protrudes through the second clamping angle section, the clamping angle with the pin-shaped element inserted therein can no longer be removed from the housing.

In a preferred embodiment of this further development, the pin-shaped element of the first loss preventer is formed by the screw, which protrudes through a bore introduced into the second clamping angle section.

Of course, it is alternatively also possible to provide a separate pin-shaped element, which only serves to execute the function of the first loss preventer. In such case, the screw does not have to protrude through a bore in the second clamping angle section, but, instead, is embodied only to shift the clamping angle. In this case, the screw presses against the planar, second clamping angle section and does not need to extend through the second clamping angle section.

In an especially preferred further development of the invention, a second loss preventer preventing a taking out and/or a falling out of the screw from the clamping angle is formed by giving the screw a greater diameter than the bore in an end region of the screw protruding from the bore. In this embodiment, thus, the second loss preventer secures the screw forming the first loss preventer preventing a taking and/or falling out of the clamping angle. Such is achieved by giving the diameter of the screw end region, which protrudes through the second clamping angle section, a greater diameter than the bore. In this way, the screw protruding through the bore of the second clamping angle section is not directly removable from the second clamping angle section. In order that the screw can be screwed into the bore of the second clamping angle section, a spring element is advantageously provided, which, in the case of the first time screwing in of the screw into the bore, effects a matching of the diameter of the end region of the screw and the diameter of the bore relative to one another.

In a first embodiment of this further development, consequently, a slit is introduced into the second clamping angle section. The screw can then be screwed into the bore of the second clamping angle section, because the slit permits a resilient expansion of the bore during the screwing in of the screw.

In a second embodiment of this further development, the greater diameter of the screw in the end region is effected by a slit ring mounted on the screw. The screw can be screwed into the bore of the second clamping angle section because the screwing in of the screw effects a resilient, i.e. temporary, collapsing of the slit ring.

In an embodiment of the invention, the screw is accessible from a second housing wall essentially perpendicular to the first housing wall. The second housing wall is essentially parallel to the second clamping angle section. The screwing in of the screw effects the shifting of the clamping angle by the predeterminable distance to the sensor unit, and the unscrewing of the screw effects the shifting of the clamping angle by the predeterminable distance away from the sensor unit.

In an additional embodiment of the invention, a hole is drilled into the housing to accommodate the screw, especially a hole directed essentially radially to the sensor unit.

In an embodiment of the invention, the hollowed-out section to accommodate the clamping angle is formed in the manufacturing of the housing, especially in a method producing from a formless material a solid body, which has a geometrically defined form.

In an embodiment of the invention, the screw and/or the clamping angle are/is manufactured of a stainless steel.

In an embodiment of the invention, the screw has a diameter of 1 mm to 10 mm, especially 2 mm to 6 mm.

In an embodiment, the first clamping angle section has a smaller area than the second clamping angle section. Especially, the second clamping angle section has an area of 10 mm$^2$ to 200 mm$^2$.

BRIEF DESCRIPTION OF THE DRAWINGS

The invention will now be explained in greater detail based on the appended, schematic drawing, wherein equal reference characters refer to equal features. When perspicuity requires or it otherwise appears sensible, already shown reference characters are omitted in subsequent figures. The figures of the drawing show as follows.

DETAILED DESCRIPTION

Figure 1:
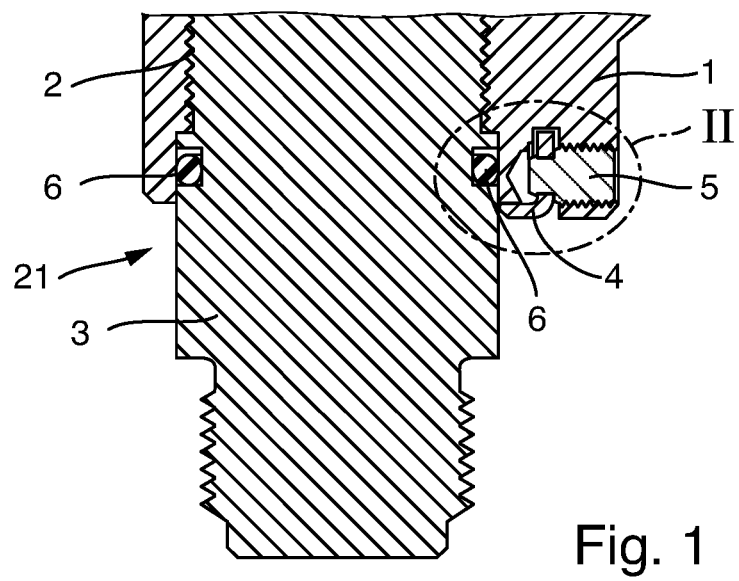
FIG. 1 shows a sectional view of an embodiment of a field device of the present disclosure.

The sectional view in FIG. 1 of an embodiment of a field device of the invention having a housing 1 shows in passageway 2 a sensor unit 3, which protrudes from the housing through a terminal opening 21 of the passageway 2. In this embodiment, the sensor unit 3 is essentially cylindrical. Of course, the sensor unit 3 can have other embodiments than that shown in the schematic view of FIG. 1, in order to comprise corresponding sensitive components for the measurement devices mentioned above. These include, for example, mechanical, oscillatable units such as, for instance, oscillatory forks, membrane oscillators or single rods in the case of vibronic fill level measuring devices.

Arranged in a region, which borders on the opening 21 of the passageway 2, is, additionally, a sealing ring serving as a sealing element 6 for and extending annularly around the sensor unit 3. The sealing ring liquid tightly seals the interface between the housing 1 and the sensor unit 3. This greatly limits the space available for securing the sensor unit 3 relative to the housing 1. In the solution of the invention, consequently, the clamping angle 4 and the screw 5 are provided for securing the sensor unit 3. By means of the screw 5 in the threaded hole 11, the clamping angle 4 can be pressed against the sensor unit 3, so that especially a twisting of the housing 1 relative to the sensor unit 3 is no longer possible. The clamping angle 4 is, in such case, inserted into a hollowed-out section 12 of the housing 1.

Figure 2A:
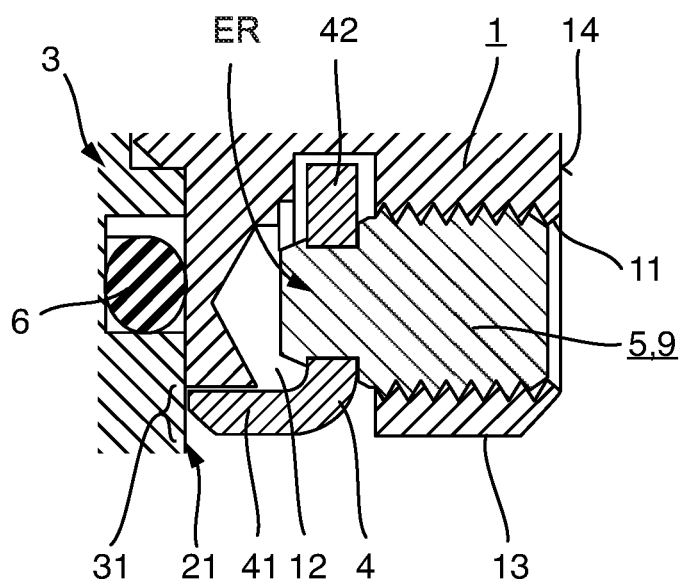
FIG. 2a shows another sectional view of an embodiment of a field device of the present disclosure.

The detailed sectional view in FIG. 2a shows the embodiment of the field device of the invention of FIG. 1 with the housing 1, wherein FIG. 2a essentially only shows the region marked with II in FIG. 1. The clamping angle 4 presses with a first clamping angle section 41 radially on a clamping region 31 of the sensor unit 3. The clamping region 31 is located between the sealing ring and the terminal opening 21. In such case, the clamping angle is inserted in such a manner into the hollowed-out section 12 that the planar, first clamping angle section 41 is essentially arranged in parallel with a first housing wall 13 and especially mounted flushly with housing wall 13. Clamping angle 4 is, in such case, shiftable by means of the screw 5 a predeterminable distance in the direction of the sensor unit 3, i.e. radially to the sensor unit 3 (see arrow in FIG. 2a). A screwing in of the screw effects that a contour 41a of the first clamping angle section 41 is moved radially to the sensor unit 3 and presses on the clamping region 31 the sensor unit 3.

A first loss preventer for clamping angle 4 is formed by engaging the screw 5 in a bore 43 (see FIG. 2b) in the second clamping angle section 42, such that it protrudes as a pin-shaped element 9 through the bore 43 of the second clamping angle section 42. This prevents removal of the clamping angle 4 from the hollowed-out section 12.

At the same time, the screw 5 after a first time screwing into the bore 43 is securely held in the second clamping angle section 42 by a second loss preventer. The second loss preventer is formed by giving the screw 5 in the end region ER protruding through the bore 43, i.e. the sensor unit 3 near region of the screw 5, a greater diameter than the bore 43. The screw 5, in such case, can be screwed into a hole drilled into the housing 1, and is accessible from a second housing wall 14. Advantageously, in this embodiment, by an unscrewing of the screw 5, the securement between sensor unit 3 and housing 1 can be very simply repeatedly released, wherein an, in given cases, unintentional dropping of the screw 5 from the bore 43 is prevented by means of the second loss preventer.

In order to be able to screw such a screw 5 first into the bore 43, a spring element is advantageously provided, which in the case of the screwing in of the screw 5 into the bore 43 effects a matching of the diameter of the end region ER of the screw and the diameter of the bore relative to one another.

Figure 2B:
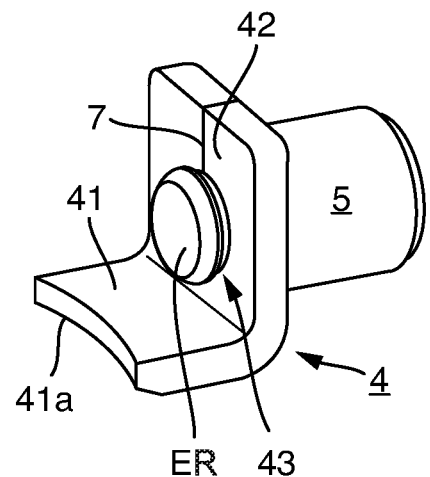
FIG. 2b shows a perspective view of a clamping angle and a screw of an embodiment of a field device of the present disclosure.

FIG. 2b represents a first variant of this, in which the bore 43 resiliently expands upon the screwing in of the screw 5. For this, a slit 7 is provided in the second clamping angle section 42. In the perspective view in FIG. 2b, also the contour 41a is matched to the curvature of the sensor unit. This shape matched contour 41a is, of course, also combinable with the subsequently related embodiments. The shape matched contour 41a achieves that the screwed tight clamping angle section 4 presses with multiple regions of the contour 41a on the clamping region 31. In this way, a multipoint-securement between sensor unit 3 and housing 1 is advantageously achieved.

Figure 3A:
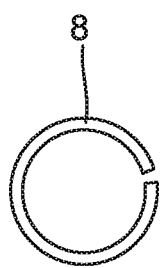
FIGS. 3a,b show another embodiment of a field device of the present disclosure having a slit ring.
Figure 3B:
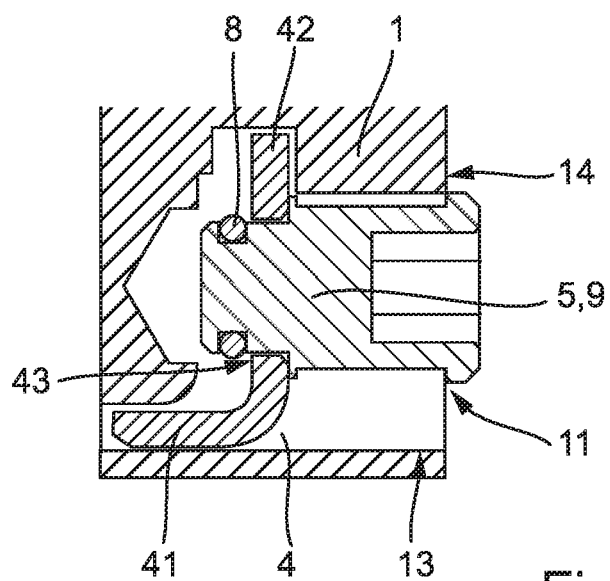

An alternative to FIGS. 2a,b, or, in given cases, a supplement for the above mentioned spring element for matching of the diameters of screw 5 and bore 43 is shown in FIGS. 3a,b. The slit ring 8 shown in FIG. 3a in a plan view effects, firstly, that the diameter in the end region ER of the screw is greater than that of the bore 43. This is shown in the sectional view of FIG. 3b. Upon first time screwing in of the screw 5 into the hole 11, the slit ring 8 is resiliently collapsed, i.e. squeezed to a smaller diameter, in such a manner that it can pass through the bore 43. In order to ease this, it is, in given cases, possible supplementally to chamfer the bore 43 in a region facing toward hole 11 and the second housing wall 14.

Figure 4:
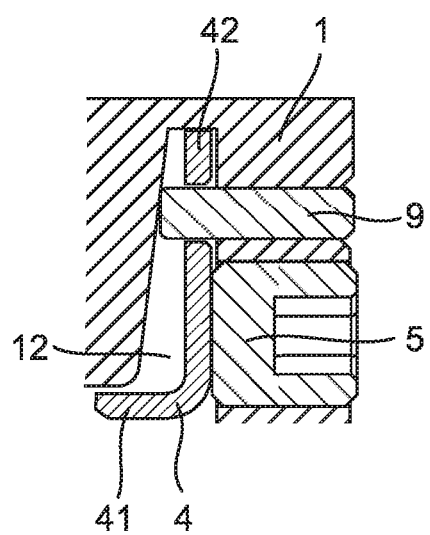
FIG. 4 shows another, alternative embodiment of a field device of the present disclosure.

Alternatively to the first loss preventer for clamping angle 4 illustrated in FIGS. 2a,b and FIGS. 3a,b, in the case of which the pin-shaped element 9 is formed by the screw 5, it is, of course, alternatively also possible to provide a pin-shaped element 9 separate and supplemental to the screw 5. Such is shown in FIG. 4. In such case, the screw 5 does not protrude through the second clamping angle section 42, but, instead, shifts the clamping angle 4 in the direction radial to the sensor unit 3 by pressing on the second clamping angle section 42.

Figure 5:
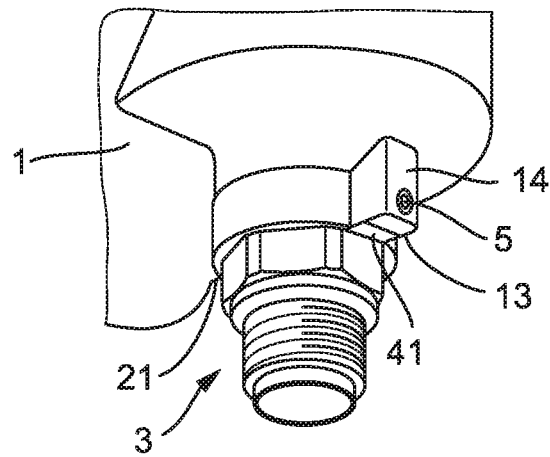
FIG. 5 shows a perspective view of an additional embodiment of a field device of the present disclosure.

FIG. 5 shows, finally, a perspective view of an embodiment of a field device of the invention. In such case, significant is that the space provided for securement is very small, especially since a sealing ring (not shown) is arranged in a region between the housing 1 and the sensor unit 3 adjoining the opening 21. The sensor unit 3 is shown in FIG. 5 only partially, since, for example, additional components of the sensor unit 3 can be screwed on the opening 21 far screw thread of the sensor unit 3 protruding out from the housing 1. Housing 1 is bulged in the illustrated region and can have in such region a hollowed-out section 12 in the housing 1 to seat the clamping angle 4. Visible in this perspective view are the first clamping angle section 41 of the clamping angle 4 arranged flushly with the first housing wall 13 and the screw 5 accessible from the second housing wall 14.

The invention claimed is:

1. A field device of automation technology, comprising:
a housing and a sensor unit configured to detect a process variable of a medium, wherein the housing has a passageway to accommodate the sensor unit, wherein the sensor unit protrudes from the housing through a terminal opening of the passageway; and a clamping angle element and a screw, wherein the clamping angle element and the screw are introduced into the housing in a region of the housing adjoining the opening of the passageway, wherein the screw is configured to shift the clamping angle element in the housing a predeterminable distance toward the sensor unit;

wherein the clamping angle element shifted toward the sensor unit is embodied to press with a first clamping angle section of the clamping angle element radially on a clamping region of the sensor unit arranged in the housing and facing the opening of the passageway;

wherein the clamping angle element is inserted in a hollowed-out section of the housing, and wherein a first loss preventer inhibiting a removal of the clamping angle element from the hollowed-out section is formed by inserting a pin-shaped element into and protruding through a second clamping angle section perpendicular to the first clamping angle section.

2. The field device of claim 1, wherein the sensor unit is moved toward the housing, and the first clamping angle section pressing on the sensor unit inhibits a twisting of the sensor unit relative to the housing after the sensor unit has been moved toward the housing.

3. The field device of claim 1, wherein the first clamping angle section is arranged parallel to a first housing wall adjoining the opening of the passageway, and wherein the first clamping angle section presses with a contour of the first clamping angle section on the clamping region of the sensor unit.

4. The field device of claim 3, wherein the shape of the contour of the first clamping angle section is matched to the shape of the clamping region of the sensor unit.

5. The field device of claim 1, wherein a sealing element is arranged between sensor unit and housing in a region adjoining the opening of the passageway, and wherein the clamping region is arranged between the sealing element and a region of the sensor unit protruding out from the opening of the passageway.

6. The field device of claim 1, wherein the pin-shaped element of the first loss preventer is formed by the screw protruding through a bore of the second clamping angle section.

7. The field device of claim 6, wherein a second loss preventer inhibiting a removal of the screw from the clamping angle element is formed by the screw having a greater diameter than the bore in an end region of the screw protruding from the bore.

8. The field device of claim 7, wherein a slit is introduced into the second clamping angle section and provides a resilient expansion of the bore during screwing of the screw.

9. The field device of claim 7, wherein the greater diameter of the screw in the end region is facilitated using a slit ring mounted on the screw.

10. The field device of claim 1, wherein the screw is accessible from a second housing wall perpendicular to the first housing wall and the second housing wall is parallel to the second clamping angle section, and wherein: screwing in of the screw causes the shifting of the clamping angle element by the predeterminable distance to the sensor unit; and the unscrewing of the screw causes the shifting of the clamping angle element by the predeterminable distance away from the sensor unit.

11. The field device of claim 1, wherein a hole in the housing oriented radially to the sensor unit is configured to receive the screw.

12. The field device of claim 1, wherein the hollowed-out section receiving the clamping angle element is formed in a manufacturing method of the housing producing a solid body having a geometrically defined form from a formless material.

13. The field device of claim 1, wherein the screw or the clamping angle element are stainless steel.

14. The field device of claim 1, wherein the screw has a diameter of 1 mm to 10 mm.

15. The field device of claim 1, wherein the first clamping angle section has a smaller area than the second clamping angle section, and wherein the second clamping angle section has an area 10 $mm^2$ to 200 $mm^2$.

* * * * *